US00RE41988E

(19) United States
(12) Reissued Patent
Oberth et al.

(10) Patent Number: US RE41,988 E
(45) Date of Reissued Patent: Dec. 7, 2010

(54) HIGHWAY CRASH CUSHION AND COMPONENTS THEREOF

(75) Inventors: Michael H. Oberth, Lincoln, CA (US); John V. Machado, Antelope, CA (US)

(73) Assignee: Energy Absorption Systems, Inc., Dallas, TX (US)

(21) Appl. No.: 09/512,894

(22) Filed: Feb. 24, 2000

Related U.S. Patent Documents

Reissue of:
(64) Patent No.: 5,733,062
Issued: Mar. 31, 1998
Appl. No.: 08/558,109
Filed: Nov. 13, 1995

(51) Int. Cl.
*E01F 15/00* (2006.01)

(52) U.S. Cl. ..... 404/6; 404/10; 256/13.1; 188/377

(58) Field of Classification Search ..... 404/6, 404/9, 10; 256/1, 13.1; 188/377; 104/15, 104/16, 106
See application file for complete search history.

(56) References Cited

U.S. PATENT DOCUMENTS

| | | | |
|---|---|---|---|
| 3,661,359 | A | 5/1972 | Walker |
| 3,674,115 | A | 7/1972 | Young et al. |
| 3,845,936 | A | 11/1974 | Boedecker, Jr. |
| 3,944,187 | A | 3/1976 | Walker |
| 3,982,734 | A | 9/1976 | Walker |
| 4,321,989 | A | 3/1982 | Meinzer |
| 4,452,431 | A | 6/1984 | Stephens et al. |
| 4,460,161 | A | 7/1984 | Grenga |
| 4,583,716 | A | 4/1986 | Stephens et al. |

(Continued)

FOREIGN PATENT DOCUMENTS

| | | | |
|---|---|---|---|
| DE | PS 26 29 507 | | 1/1977 |
| DE | 37 02 794 | A | 8/1988 |
| DE | 37 05 485 | | 9/1988 |
| DE | 37 08 861 | A | 10/1988 |
| DE | 38 13 706 | A | 11/1989 |
| EP | 0 286 782 | | 10/1988 |
| EP | 0 389 081 | | 9/1990 |
| SU | 1 342 964 | | 7/1986 |
| WO | WO 93/00480 | | 1/1993 |

OTHER PUBLICATIONS

"Crash Testing a Reusable Polyethylene Narrow Impact Attenuation System," Project No. 472380, Texas Transportation Institute, 31 pages (Mar. 1994).

"Crash Testing a Reusable Polyethylene Narrow Impact Attenuation System," Project No. 472380, Test 472380–8, Texas Transportation Institute, 29 pages (Jan. 1995).

U.S. Department of Transportation Federal Highway Administration Mar. 3, 1995 Letter of Conditional Acceptance of REACT 350 System and Enclosures (9 pages).

U.S. Department of Transportation Federal Highway Administration Apr. 12, 1995 Letter of Full Acceptance of REACT 350 System and Enclosures (2 pages).

*Primary Examiner*—Gary S Hartmann
(74) *Attorney, Agent, or Firm*—Brinks Hofer Gilson & Lione

(57) ABSTRACT

A highway crash cushion includes a single, central, rigid, guide tail that guides the crash cushion in axial collapse. Diaphragm assemblies are each provided with recessed legs, and a central guide that slides along the rail while locking against the rail in a lateral collision. The diaphragm assemblies support fender panels that include four longitudinally extending ridges, a central slot, and a tapered trailing edge that reduces vehicle snagging. Energy absorbing elements are disposed between the diaphragm assemblies, and each includes an indicator that clearly indicates when the element has been compressed and possibly damaged.

63 Claims, 5 Drawing Sheets

U.S. PATENT DOCUMENTS

| | | | |
|---|---|---|---|
| 4,607,824 | A | 8/1986 | Krage et al. |
| 4,674,911 | A | 6/1987 | Gertz |
| 4,681,302 | A | 7/1987 | Thompson |
| 4,815,565 | A | 3/1989 | Sicking et al. |
| 4,838,523 | A | 6/1989 | Humble et al. |
| 4,909,661 | A | 3/1990 | Ivey |
| 5,022,782 | A | 6/1991 | Gertz et al. |
| 5,054,954 | A | 10/1991 | Cobb et al. |
| 5,112,028 | A | 5/1992 | Laturner |
| 5,217,318 | A | 6/1993 | Peppel |
| 5,286,137 | A | 2/1994 | Cicinnati et al. |
| 5,314,261 | A | 5/1994 | Stephens |
| 5,403,112 | A | 4/1995 | Carney, III |
| 5,498,100 | A | 3/1996 | Guernsey |
| 5,547,310 | A | 8/1996 | Muller |
| 5,660,496 | A | 8/1997 | Muller et al. |
| 5,765,811 | A | 6/1998 | Alberson et al. |
| 5,797,592 | A | 8/1998 | Machado |
| 5,957,435 | A | 9/1999 | Bronstad |

28
29
30
32
34
36
38
40
42
12
26
3
4

Fig. 10
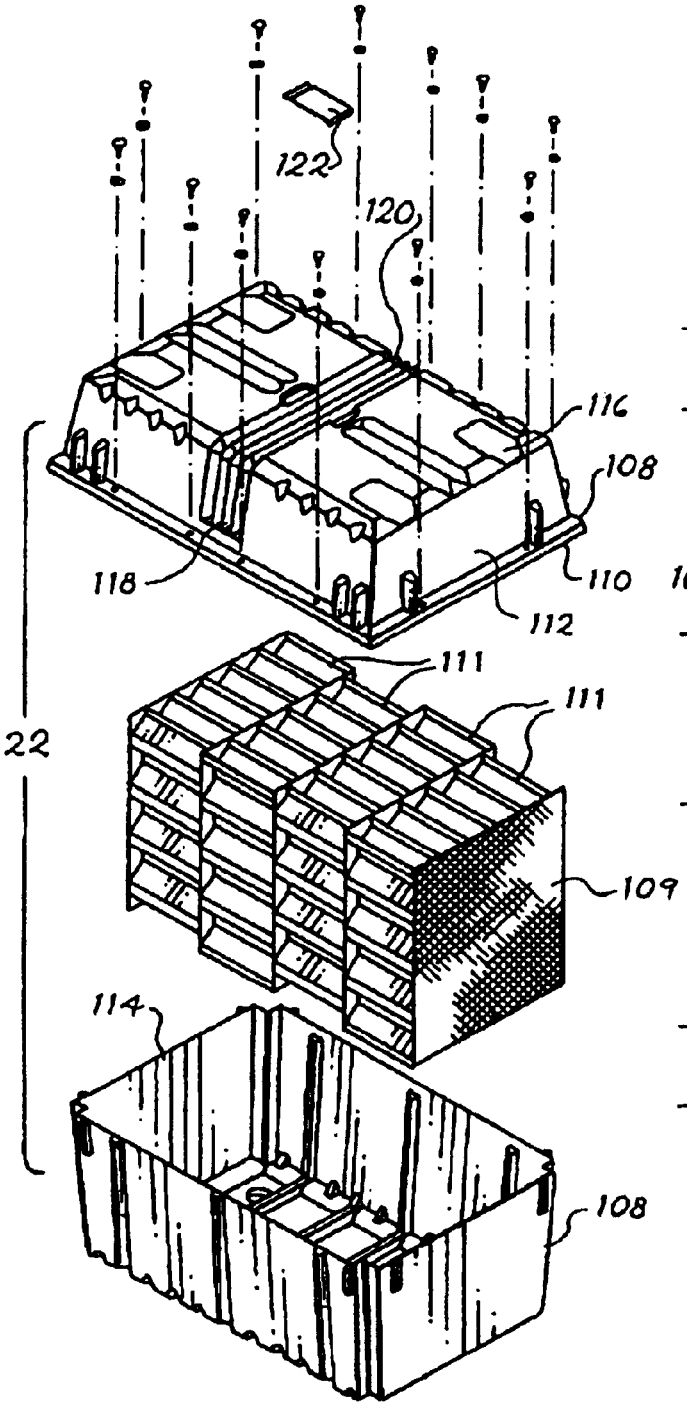
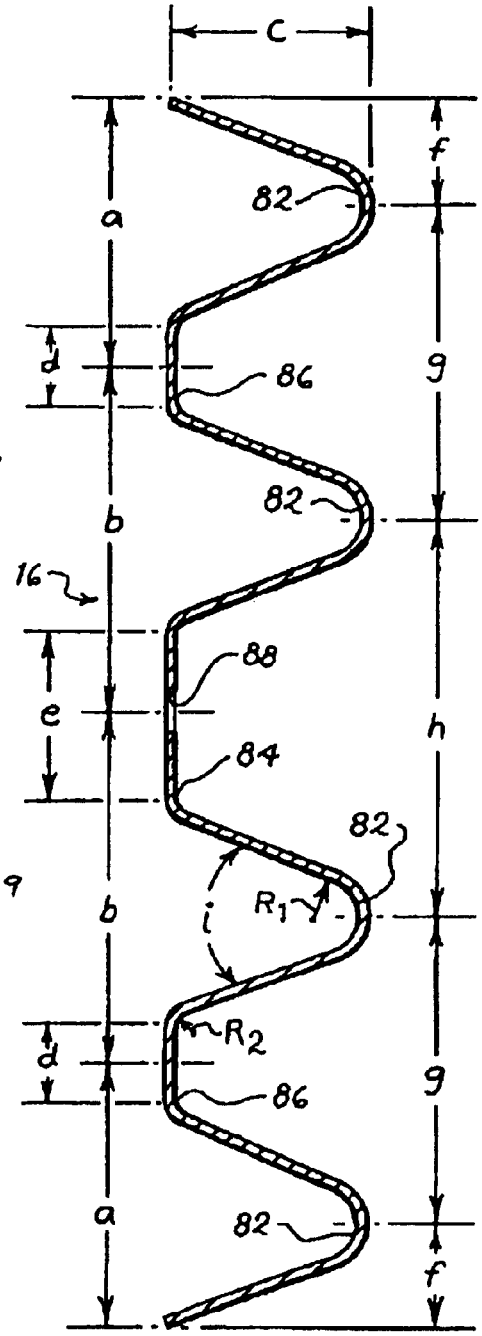
Fig. 8

HIGHWAY CRASH CUSHION AND COMPONENTS THEREOF

Matter enclosed in heavy brackets [ ] appears in the original patent but forms no part of this reissue specification; matter printed in italics indicates the additions made by reissue.

BACKGROUND OF THE INVENTION

The present invention relates to improvements to a highway crash cushion of the type having an array of diaphragms, a plurality of energy absorbing elements disposed between the diaphragms, and an array of fender panels extending alongside the diaphragms.

Highway crash cushions of this general type have proven to be successful in a wide variety of applications. Walker U.S. Pat. No. 3,982,734 describes one early version of such a crash cushion, and Meinzer U.S. Pat No. 4,321,989 discloses another. Typically, such crash cushions are used alongside highways in front of obstructions such as concrete walls, toll booths and the like.

In the event of an axial impact, the crash cushion is designed to absorb the kinetic energy of an impacting vehicle as the crash cushion collapses axially. In such an axial collapse, the diaphragms move closer to one another, the fender panels telescope over one another, and the energy absorbing elements are compressed. After such a collision many of the component parts can be reused by repositioning the diaphragms and fender panels in the original position, and replacing the energy absorbing elements and other damaged components.

The performance of such a highway crash cushion in lateral rather than axial impacts is also significant. When an impacting vehicle strikes the fender panels obliquely, it is desirable that the crash cushion act as a guard rail, which redirects the impacting vehicle without sending it back into traffic at a steep angle, and without allowing the impacting vehicle to move into the region on the other side of the crash cushion protected by the crash cushion.

Another aspect of such crash cushions is the need for simple maintenance and repair. Typically, such crash cushions are positioned alongside a high speed roadway, and it is therefore important to minimize traffic disruption and to minimize exposure of maintenance personnel to the hazards of adjacent traffic in maintenance and repair procedures.

In view of the foregoing operational and maintenance requirements for crash cushions, there is a need for an improved crash cushion that provides increased rigidity in a lateral [impacts] *impact* that decelerates an impacting vehicle in a more controlled manner in a lateral impact, both when the vehicle is moving along the fender panels in a forward and in a reverse direction, and to provide a crash cushion which is simpler to install and easier to maintain.

SUMMARY OF THE INVENTION

The present invention is directed to a number of separate improvements to a highway crash cushion of the type defined initially above. These improvements are preferably used together as described below. It should be clearly understood, however, that these improvements can be used separately from one another and in various subcombinations in alternative applications.

According to a first aspect of this invention, a highway crash cushion of the type described above is provided with a single rail disposed under the crash cushion and anchored to a support surface. A plurality of guides [are] *is* provided, each coupled to a respective one of the diaphragms and each substantially centered with respect to the respective diaphragm. The guides are mounted to the rail to slide along the rail in an axial impact, and to restrict movement of the diaphragms with respect to the rail in both lateral directions. The rail is substantially centered with respect to the diaphragms, thereby reducing any tendency of an impacting vehicle to snag on the rail. Furthermore, since a single, centered rail is used, installation is simplified.

According to a second aspect of this invention, a highway crash cushion as described above includes an improved diaphragm assembly. Each diaphragm assembly includes an upper part that comprises a diaphragm adapted to apply compressive loads to an adjacent energy absorbing element, and a lower part secured to the upper part. The lower part comprises a leg assembly comprising an upper portion mounted to support the upper part, a lower portion, two side portions and a centerline extending between the side portions. Each lower portion is connected to two feet shaped to support the leg assembly on a support surface. The feet extend outwardly from the respective leg assembly, away from the centerline, such that the feet are separated from the respective centerline by a distance $D_F$, the side portions are separated from the respective centerline by a distance $D_L$, and the ratio $D_F/D_L$ is greater than 1.1. Alternately, the difference $D_F-D_L$ can be maintained greater than 4 cm. By recessing the legs with respect to the feet, there is a reduced chance that an impacting vehicle will snag on the legs in a lateral impact. In this way, any tendency for the impacting vehicle to be decelerated in an uncontrolled manner is reduced.

Preferably, each leg assembly supports a removable guide on the centerline. This guide includes a first pair of spaced plates facing the centerline on one side of the centerline, and a second pair of spaced plates facing the centerline on the other side of the centerline. This guide cooperates with the guide rail described above to provide rigidity in the crash cushion in a lateral impact.

According to a third aspect of this invention, a fender panel for a highway crash cushion as described above includes a trailing edge, a leading edge, and a side edge. The trailing edge is tapered such that the first and second portions of the trailing edge are separated from a reference line transverse to the side edge by lengths $L_1$ and $L_2$, respectively. The length $L_1$ is greater [is] than the length $L_2$ by at least 10 cm. Preferably, the fender panel defines a plurality of ridges extending generally parallel to the side edge, and the first portion of the trailing edge is positioned in a groove of the fender panel between adjacent ones of the ridges. The tapered trailing edge has been found to reduce the tendency of an impacting vehicle to snag on the fender panel when the impacting vehicle approaches the fender panel from the direction of the trailing edge.

According to a fourth aspect of this invention, a fender panel for a highway crash cushion as described above comprises four parallel ridges separated by three parallel grooves. The grooves comprise a central groove and two lateral grooves. The central groove forms a slot extending parallel to the ridges, and the slot extends over a length of at least one half the length of the fender panel. The grooves each have a respective width transverse to the slot, and the central groove width is greater than each of the lateral groove widths. In use, a fastener passes through the slot and is secured to the crash cushion to allow the fender panel to slide relative to the fastener. This arrangement has been found to provide increased strength to the fender panel with respect to bending, flattening out, and tear-out, and increased pull-out resistance to the fastener.

According to a fifth aspect of this invention, a highway crash cushion energy absorbing element is provided with an indicator movably mounted on the energy absorbing element to move between first and second positions. This indicator is visible outside of the energy absorbing element in at least the second position. A retainer is coupled to the energy absorbing element to retain the indicator in the first position prior to distortion of the energy absorbing element. The retainer is positioned and configured such that distortion of the energy absorbing element by more than a selected amount releases the indicator from the retainer. In the preferred embodiment described below, a spring is coupled to the indicator to bias the indicator to the second position, and the energy absorbing element includes a housing that forms a zone of increased compressibility in the region between the mounting location for the indicator and the mounting location for the retainer.

In use, a maintenance inspector can readily determine remotely whether an individual energy absorbing element has been deformed (as for example in a low speed collision). Such deformation releases the indicator from the retainer and allows the indicator to move to the second position, where it can readily be seen.

The invention itself, together with further objects and advantages, will best be understood by reference to the following detailed description, taken in conjunction with the accompanying drawings.

BRIEF DESCRIPTION OF THE DRAWINGS

FIG. 8 is a cross-sectional view of one of the fender panels of the embodiment of FIG. 1.

FIG. 10 is [a] an exploded perspective view of one of the energy absorbing elements of the embodiment of FIG. 1.

DETAILED DESCRIPTION OF THE PRESENTLY PREFERRED EMBODIMENTS

Figure 1:
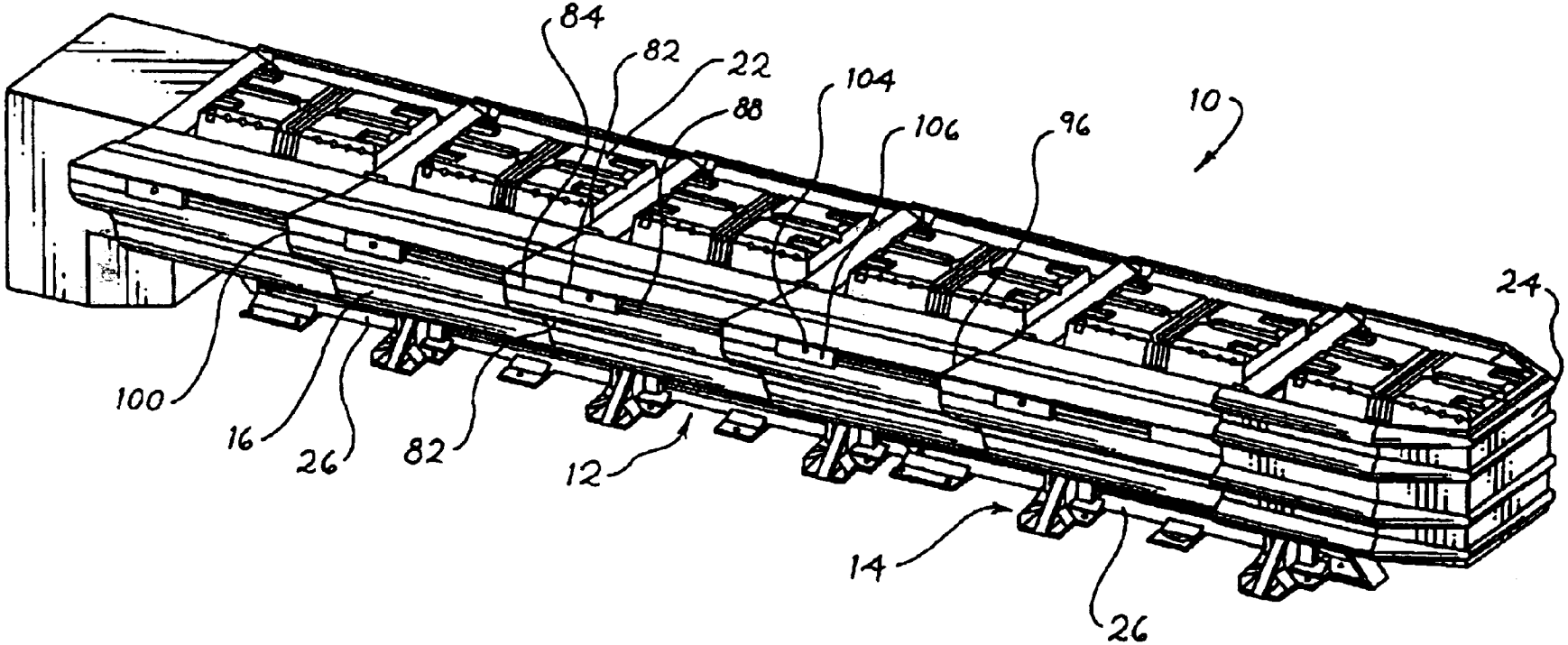
FIG. 1 is a perspective view of a highway crash cushion which incorporates a presently preferred embodiment in the present invention.

Turning now to the drawings, FIG. 1 shows a perspective view of a highway crash cushion 10 that incorporates a presently preferred embodiment of this invention. The crash cushion 10 is mounted to slide axially along a guide rail 12. The crash cushion 10 includes an array of spaced, parallel diaphragm assemblies 14. Fender panels 16 are secured between adjacent diaphragm assemblies 14, and the fender panels 16 and the diaphragm assemblies 14 form an array of enclosed bays. An energy absorbing element 22 is disposed within each of the bays, between an adjacent pair of diaphragm assemblies 14. A nose fender 24 extends around the forwardmost energy absorbing element 22.

The following discussion will take up each of the major components of the crash cushion 10.

The Guide Rail

FIGS. 2–5 show various views of a portion of the guide rail 12. In this embodiment, the guide rail 12 is made up of two or more segments 26. Each of the segments 26 includes an upper plate 28 and two side plates 30. The upper plate 28 forms two opposed, horizontally extending flanges 29. The side plates 30 are secured to a series of lower plates 32. Each of the lower plates 32 defines at least two openings 34 sized to receive a respective ground anchor (not shown in FIGS. 2–5). Bracing plates 36 are secured between the side plates 30 and the lower plates 32 to provide additional rigidity.

Figures 2, 3, 4, 5:
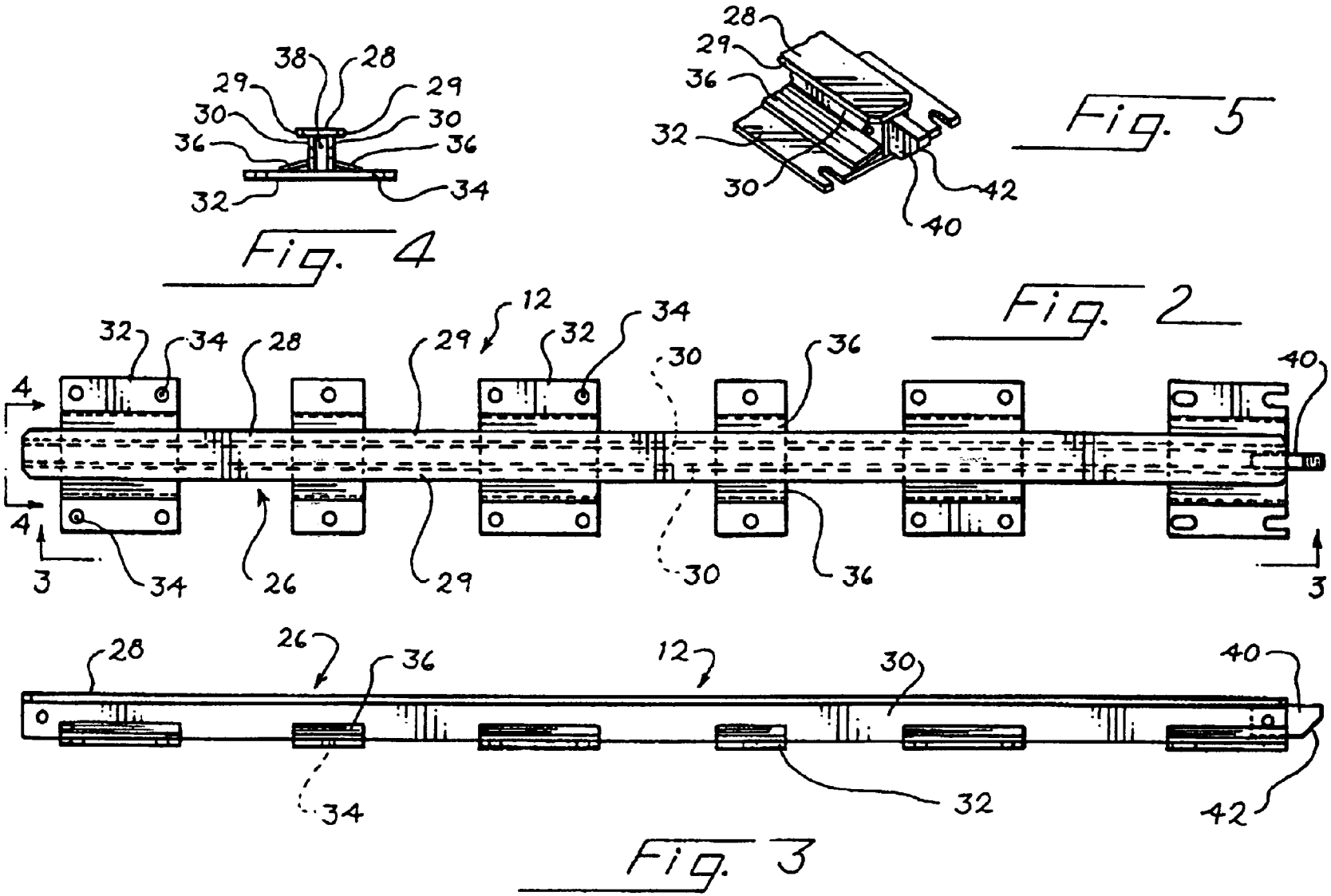
FIG. 2 is a top view of a segment of the guide rail of the embodiment of FIG. 1.
FIG. 3 is a side elevational view taken along line 3—3 of FIG. 2.
FIG. 4 is an end view taken along line 4—4 of FIG. 2.
FIG. 5 is an end perspective view of the guide rail segment of FIG. 2.

As shown in FIG. 4, one end of the segment 26 defines a central recess 38 which in this embodiment is generally rectangular in shape. As shown in FIGS. 2, 3, and 5, the other end of the segment 26 defines a central protrusion 40. The central protrusion 40 is generally rectangular in shape, but it defines a sloping lower surface 42. In this embodiment the central protrusion 40 is welded in position in the rearward end of the segment 26.

Depending upon the application, the crash cushion 10 can have a varying number of diaphragm assemblies 14. In the example shown in FIG. 1, there are five separate diaphragm assemblies 14, and the guide rail 12 is made up of two segments 26. The central protrusion 40 of the forward segment fits into the central recess 38 of the rearward segment to maintain alignment of the two segments 26.

Simply by way of example, and without intending any limitation, the following exemplary dimensions have been found suitable. The upper plate 28 can be formed of steel plate 10 cm in width and 1.3 cm in thickness. The side plates 30 can be formed of flat bar 7.6 cm in height and 0.95 cm in thickness. The lower plates 32 can be 13 cm in thickness. A hot rolled steel such as ASTM A-36 or AISM 1020 has been found suitable, and standard welding techniques are used to secure the various components together.

The segments 26 are shorter and therefore more easily transported and installed than a one-piece guide rail. Furthermore, in the event of damage, only the damaged segment 26 must be replaced, and maintenance costs are thereby reduced. The sloping lower surface 42 of the central protrusion 40 and the slots in the lower plate 32 near the central protrusion 40 allow the damaged segment 26 to be removed by lifting up the end forming the central recess 38.

By providing three separate segments, having lengths appropriate for one bay, two bays, and three bays, respectively, crash cushions of varying lengths between one bay and twelve bays can readily be assembled.

The Diaphragm Assemblies

Figure 7:
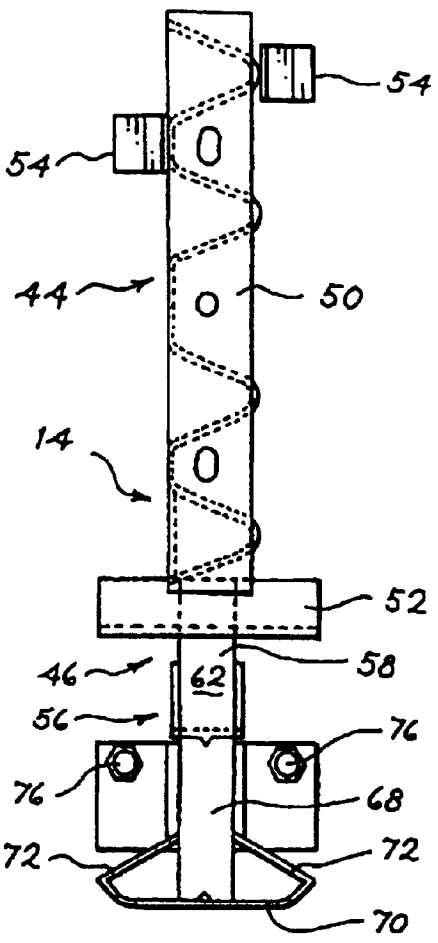
FIG. 7 is a side view of the diaphragm assembly of FIG. 6.
Figure 6:
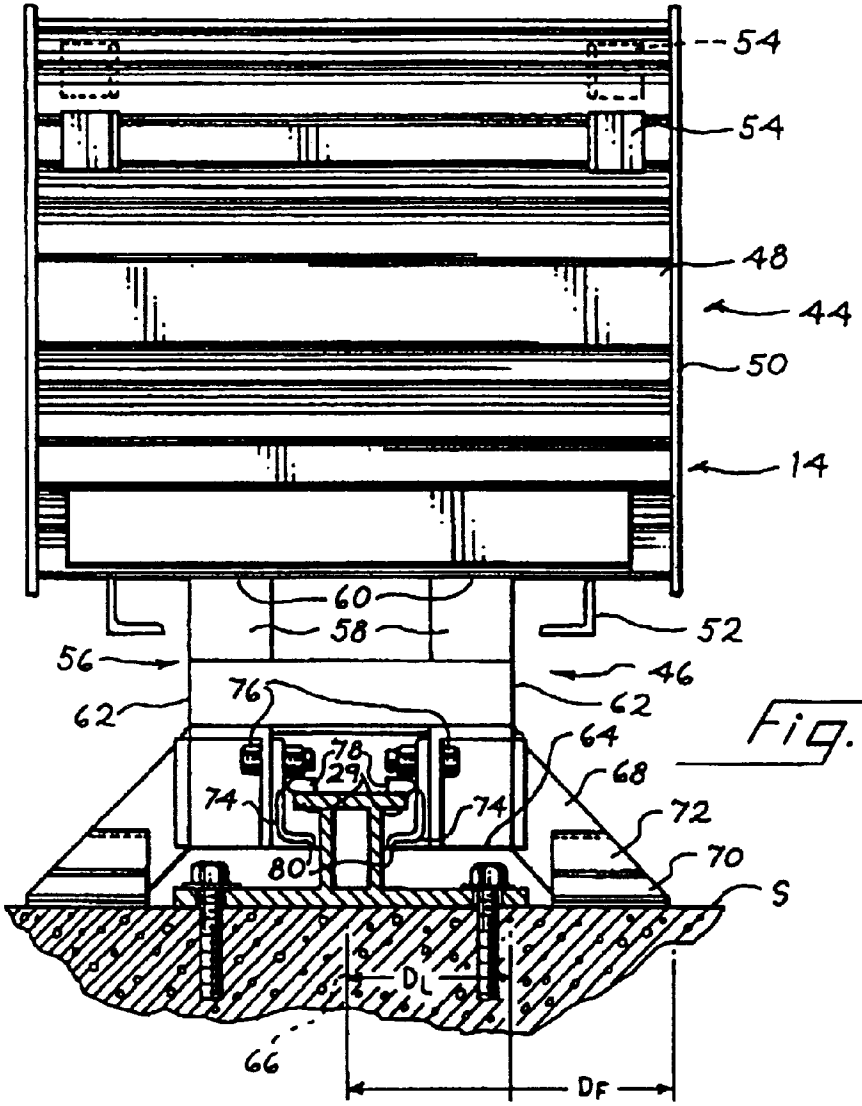
FIG. 6 is a front elevational view of a diaphragm assembly included in the embodiment of FIG. 1, showing the relationship between the diaphragm assembly and the guide rail.

FIGS. 6 and 7 show front and side views, respectively, of a diaphragm assembly 14. Each diaphragm assembly 14 includes an upper part 44 and a lower part 46. The upper part 44 forms a diaphragm, and includes a central panel 48, which in this embodiment is a ridged metal plate, identical in cross section to the fender panels described below. The panel 48 is rigidly secured at each end to a respective metal plate 50. Support brackets 52 can be secured to the lower edge of the panel 48 to support the energy absorbing elements. Alignment brackets 54 can be secured to the panel 48 to locate the energy absorbing elements laterally in the bay.

The lower part 46 of the diaphragm assembly 14 includes a leg assembly 56. The leg assembly 56 in this embodiment includes two rectangular-section legs 58 which are rigidly secured to the upper portion 44, as for example by welding. The leg assembly 56 forms an upper portion 60 that is secured to the diaphragm of the diaphragm assembly 14, two side portions 62, and a lower portion 64. The side portions 62 are symmetrically positioned with respect to a centerline 66 that is vertically oriented in this embodiment.

Each of the legs 58 supports a respective foot 68. The feet 68 extend downwardly and outwardly from the lower portion 64 of the legs 58. Each of the feet 68 terminates in a lower plate 70 and a pair of side plates 72. The lower plate 70 is shaped to support the diaphragm assembly 14 on a support surface S, and to slide freely along the support surface S. This support surface S can be formed for example by a concrete pad. The side plates 72 form ramps extending upwardly from the lower plate 72 to the foot 68. These ramps reduce snagging of the tire or wheel of an impacting vehicle on the lowermost portion of the foot 68.

In FIG. 6 the reference symbol $D_F$ is used to designate the distance of the outermost edge of the foot from the centerline and reference symbol $D_L$ is used to designate the distance of the outermost portion of the side portion 62 from the centerline 66.

As shown in FIG. 6 and 7, the legs 58 are recessed with respect both to the feet 68 and the panel 48. This way, any tendency of the wheel or tire of a vehicle moving along the fender panels to snag on the legs 58 is substantially reduced. The ratio $D_F/D_L$ is greater than 1.1, preferably greater than 1.4, and most preferably greater than 1.8. In this way, the legs 58 are substantially recessed. Similarly, the difference between $D_F/D_L$, is greater than 4 cm, preferably greater than 8 cm, and most preferably greater than 12 cm to obtain this advantage. In this preferred embodiment the ratio $D_F/D_L$ is 1.85 and the difference $D_F$–$D_L$ is 14.8 cm.

As shown in FIG. 6, two guides 74 are removably secured between the legs 58, as for example by fasteners 76. Each of the guides 74 includes a respective pair of spaced, horizontal plates 78, 80 facing the centerline 66. The plates 78, 80 receive the flanges 29 therebetween, with the upper plates 78 resting on the upper surface of the flanges 29 and the lower plates 80 positioned to engage the lower surface of the flanges 29.

During operation, the weight of the diaphragm assemblies 14 is supported by the feet 68 and the plates 78. The plates 80 prevent the diaphragm assemblies 14 from moving upwardly with respect to the guide rail 12 in an impact.

Because the guides 74 are held in place in the diaphragm assembly 14 by removable fasteners 76, the guides 74 can be replaced if damaged in an impact without removing the diaphragm assemblies 14.

As the crash cushion 10 collapses in an axial impact, the diaphragm assemblies 14 slide down the guide rail 12, while the guide rail 12 prevents substantially all lateral movement of the crash cushion 10. Preferably, the guides 74 have a substantial length, and can for example be 20 cm in length and approximately 1.3 cm in thickness. A hot rolled steel such as ASTM-36 or AISM 1020 has been found suitable. The length of the guides 74 reduces any tendency of the diaphragm assemblies 14 to rock and bind to the guide rail 12 in an axial collapse, thereby insuring a stable, consistent axial collapse of the crash cushion. Because the lower plates 80 engage the underside of the flanges 29, overturning of the crash cushion 10 is prevented. The upper plates 78 of the guides 74 maintain the diaphragm assemblies 14 at the proper height relative to the guide rail 12, in spite of irregularities in the support surface S. The guide rail 12 and the guide 74 provide lateral restraint guided collapse, and resistance to overturning throughout the entire axial stroke of the collapsing crash cushion 10.

Furthermore, in the event of a side impact against the fender panels 16, the guides 74 tend to lock against the guide rail 12 as they are moved by the impacting vehicle into a position oblique to the guide rail 12. This locking action provides further lateral rigidity to the crash cushion 10 in a lateral impact.

The wide separation between the feet 68 increases stability of the crash cushion 10 and resistance to overturning in a lateral impact.

The Fender Panels

Figure 9:
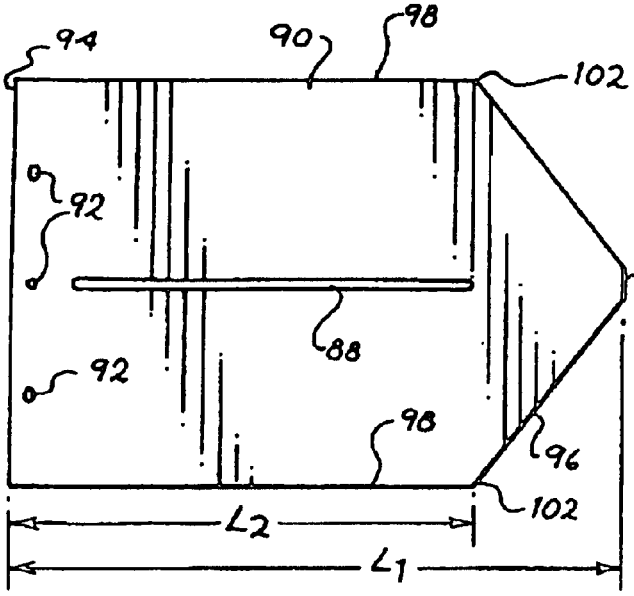
FIG. 9 is a plan view of a metal plate from which the fender panel of FIG. 8 is formed.

Turning now to FIGS. 8 and 9, the fender panels 16 have been improved to provide increased rigidity and improved operation to the crash cushion 10. FIG. 8 is a cross-sectional view through one of the fender panels 16. As shown in FIG. 8, the fender panel 16 includes four parallel ridges 82 and three parallel grooves. These grooves are not identical to one another, and the central groove 84 is in this embodiment wider than the lateral grooves 86. The groves 84, 86 define lower-most portions that are co-planar, and the ridges 82 are uniform in height.

Because the fender panel 16 includes four ridges 82 instead of the conventional three, it is symmetrical about the central groove 84. This allows the longitudinally extending slot 88 to be positioned on the flat portion of the central groove 84. It has been discovered that for a fender panel of the same height, material and thickness as in a prior art thrie beam, the improved geometry discussed above increases the section modulus and the tensile strength of the panel, by approximately 20% for the section modulus, and approximately 15% for the tensile cross section. Furthermore, by having three grooves rather than two as in the prior art thrie panel, an additional fastener can be used to secure the fender panel 16 to the adjacent diaphragm assembly 14, thereby increasing tear out strength by 50%.

Simply by way of example, preferred dimensions for the fender panel 16 are listed in the attached Table 1. In this embodiment, the fender panel can be formed of a 10 gauge, cold rolled steel such as that identified as alloy ASTM-A-570, grade 50. This material has a yield strength of 50,000 psi.

TABLE 1

| Reference Symbol from FIG. 8 | Dimension (mm unless otherwise indicated) |
|---|---|
| a | 109 |
| b | 145 |
| c | 83 |
| d | 42 |
| e | 80 |
| f | 43 |
| g | 128 |
| h | 166 |
| i | 44* |
| $R_1$ | 15 |
| $R_2$ | 6 |

FIG. 9 shows a fender panel metal plate 90 in plan view, prior to formation of the ridges 82 and grooves 84, 86. This metal plate 90 defines a longitudinal slot 88 and three attachment apertures 92. The metal plate defines a leading edge 94, a trailing edge 96 and two side edges 93. In the following discussion the leading edge 94 will be considered to define a reference line that is perpendicular to the side edges 98. In alternate embodiments it is not required that the leading edge 94 be shaped in this manner. The apertures 92 are used to fasten the fender panel to a forward diaphragm assembly 14, and the slot 88 is used to fasten the fender panel to a rearward diaphragm assembly 14. The slot 88 extends over more than one-half the length of the plate 90.

As shown in FIG. 9, the trailing edge 96 is tapered, and it includes a first portion 100 and a second portion 102. In this embodiment the trailing edge 96 is symmetrical, and the first portion 100 is aligned with the slot 88, while the second portion 102 is formed in two parts, one adjacent each of the side edges 98. The symbol $L_1$ is used for the separation between the first portion 100 and the leading edge 94, and the symbol $L_2$ is used for the separation between the second portion 102 and the leading edge 94. In this embodiment the difference $L_1$ minus $L_2$ is greater than or equal to 10 cm. Preferably this difference is greater than 20 cm, and most preferably it is greater than 30 cm. In this embodiment $L_1$ equals 131 cm, $L_2$ equals 98 cm and $L_1$–$L_2$ equals 33 cm. The slot 88 can be 85 cm in length. As shown in FIG. 1, the first portion 100 of a given fender panel 16 is disposed in the central groove 84 of the fender panel 16 that is adjacent to the rear.

It has been discovered that this arrangement reduces vehicle snagging in a wrong-way impact, where the impacting vehicle slides along the side of the crash cushion 10, approaching the fender panels 16 such that the trailing edges 96 make initial fender panel contact with the vehicle (from left to right with respect to the side of the crash cushion 10 shown in FIG. 1). Because the first portions 100 are disposed in the central grooves 84, they are somewhat recessed and less likely to snag the vehicle. The trailing edge 96 is tapered, sloping upwardly on the upper portion of the trailing edge and downwardly on the lower portion of the trailing edge. This tapered arrangement for the trailing edge has been found to reduce vehicle snagging. When the vehicle sheet metal begins to tear as it slides longitudinally down one side of the crash cushion 10, the vehicle sheet metal encounters an upward or downwardly sloping portion of the trailing edge 96. This causes the tearing action to cease. Snagging of the vehicle tends to be self-releasing, and not to become progressively worse as the vehicle proceeds down the crash cushion 10 in a wrong-way impact.

Though the trailing edge 96 discussed above is symmetrical about the centerline of the fender panel 16, this is not required in all embodiments. If desired, various asymmetrical arrangements can be used. Also, if desired the fender panel can define multiple first portions, each disposed in a respective groove, and each separated by a substantially constant distance from the reference line.

As shown in FIG. 1, the rearward portion of the fender panel 16 is secured to the rearward adjacent diaphragm by a fastener 104, *which* includes a plate 106. This plate 106 has sides shaped to conform to the adjacent ridges 82, and forward and rearward edges that are bevelled to reduce vehicle snagging. The plate 106 is relatively large, and can for example be 25 cm in length, and can define a lug extending downwardly into the respective slot 88. This arrangement provides a system in which the fender panels telescope smoothly against one another in an axial collapse, and in which pull out of the fastener 104 is substantially prevented.

The improved geometry of the fender panel 16 is not restricted to use with highway crash cushions, but can be used with a variety of other roadside barriers, including guard rails. In some of these applications the slot 88 may not be required.

The Energy Absorbing Element

FIG. 10 shows an exploded view of one of the energy absorbing elements 22. This energy absorbing element 22 includes an outer housing 108 that is formed in two parts that meet at a horizontally oriented seam 110. The housing defines front and rear surfaces 112, 114 that are positioned against the adjacent diaphragm assemblies 14. Each housing 108 also defines a respective top surface 116. The top surface 116 defines a zone of increased compressibility 118 that in this embodiment defines an array of parallel pleats or corrugations 120. These corrugations 120 extend generally parallel to the front and rear surfaces 112, 114. The zone of increased compressibility 118 ensures that in the event the housing 108 is compressed axially between the front and rear surfaces 112, 114, this compression is initially localized in the zone 118. Simply by way of example, the housing 108 can have a length, height and width of about 82, 57, and 55 cm, and the zone 118 can have a width of about 11 cm.

The housing 108 can be molded of any suitable material, such as linear, low-density polyethylene having an ultraviolet inhibitor for example. The housing 108 can contain any suitable energy absorbing components 109, and this invention is not limited to any specific choice for these components 149. For example, the energy absorbing components can be formed as described in U.S. Pat. No. 4,352,484, using a paper honeycomb material (5 cm cell diameter and 5 cm layer thickness) and a polyurethane foam. Alternately, the energy absorbing elements 109 can be formed as four metal honeycomb elements 111, each 17.8 cm thick, with a cell diameter of 3.8 cm. The elements are preferably formed of low carbon, fully annealed steel sheets (0.45 mm thick in one element and 0.71 mm thick in the other three). In the embodiment described here, the forward energy absorbing elements use the paper honeycomb material and the rearward energy absorbing elements use the steel material, both as described above. If desired, the brackets 52, 54 can be deleted and replaced with brackets (not shown) on the panels 48 that support the housing 108 at the lower, protruding edge of the upper part of the housing, adjacent the seam 110.

Figure 12:
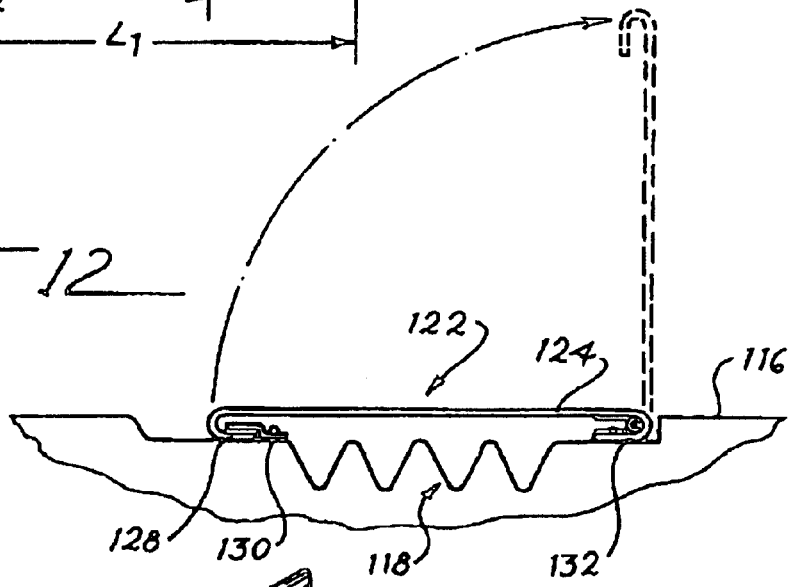
FIG. 12 is a [cross sectional] *cross-sectional* view taken along line 12—12 of FIG. 11.
Figure 11:
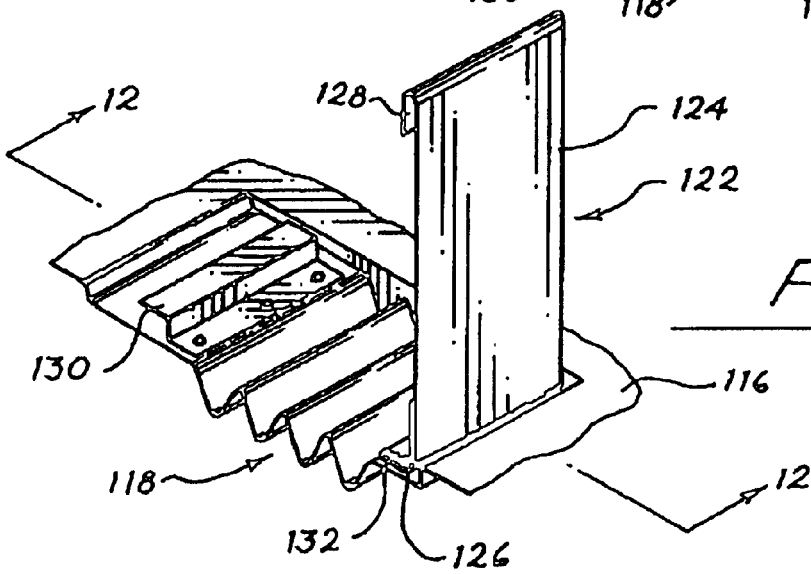
FIG. 11 is a perspective view showing the indicator of FIG. 10 in a raised position.

FIGS. 11 and 12 show two views of an indicator 122 that is mounted on the top surface 116 of the energy absorbing element. This indicator 22 includes a plate 124 that has an outer surface. This outer surface can for example be covered with a reflective material. The plate 124 is mounted for pivotal movement by a mounting 126 on a first side of the zone 118. The indicator 122 includes a lip 128 on the opposite end of the plate 124. A retainer 130 is mounted to the top surface 116 on the opposite side of the zone 118. As best shown in FIG. 12, the indicator 122 is pivotally movable between a first position in which the plate 124 is alongside and recessed into the top surface 116, and a second position in which the plate 124 is pivoted upwardly and outwardly to a position substantially perpendicular to the top surface 116. The first and second positions can each correspond to a range of positions. In the second position the plate 124 is clearly visible from outside the energy absorbing element 122. A spring 132 biases the indicator 122 to the second, more visible position.

As shown in FIG. 12, the indicator 122 is initially installed in the first or lower position. In this position the retainer 130 overlaps the lip 128 by a selected distance, which can correspond to a range of distances. In this embodiment, the selected distance is about 1 to 2 cm. The indicator 122 is mounted to the housing 108 at a first location, and the retainer 130 is mounted to the housing at a second location.

In the event that the housing 108 is distorted even temporarily in a low speed event such that the first and second locations approach one another by more than the selected distance of overlap between the lip 128 and the retainer 130, then the indicator 128 moves out of engagement with the retainer 130, and the spring 132 moves the indicator 122 to the upper position shown in FIG. 11.

A maintenance inspector can readily determine if any of the energy absorbing elements 22 has been compressed excessively simply by looking for indicators 122 in the extended position. This can be done at a considerable distance, and does not require close inspection.

Of course, many alternatives to the indicator 122 are possible. For example, the spring does not have to be a separate element, and the desired biasing force can be obtained by bending of the indicator 122 itself. Furthermore, the zone of increased compressibility can be formed with many geometries, and corrugations are not always required. If desired, the retainer 130 can engage the indicator 122 along the side rather than the end of the indicator 122. Furthermore, the indicator can move between the first and second positions with translational rather than pivoting movements.

Conclusion

From the foregoing detailed description it should be apparent that an improved crash cushion has been described. The central guide rail reduces vehicle snagging and simplifies installation while providing excellent rigidity against lateral movement and controlled axial collapse. The improved diaphragm assembly utilizes recessed legs that again reduce vehicle snagging. These assemblies are rigid, and are designed to lock against the guide rail in a lateral impact. The improved fender panels are stronger, with an improved cross-sectional shape that increases pull out resistance and enhances a controlled axial collapse. The tapered trailing edge further reduces vehicle snagging in a wrong-way collision. The energy absorbing element indicator indicates remotely to a maintenance inspector that the element has been compressed and possibly damaged, and is therefore in need of replacement.

Of course, it should be understood that a wide range of changes and modifications can be made to the preferred embodiment described above. It is therefore intended that the foregoing detailed description be considered as illustrative and not as limiting. It is the following claims, including all equivalents, that are intended to define the scope of this invention.

We claim:

1. In a highway crash cushion of the type comprising an array of diaphragms, a plurality of energy absorbing elements disposed between the diaphragms, and an array of fender panels extending alongside the diaphragms, the improvement comprising:

a single rail disposed under the crash cushion and anchored to a support surface;

a plurality of guides, each coupled to a respective one of the diaphragms and substantially centered with respect to the respective diaphragm;

said guides mounted on the rail to slide along the rail and to restrict movement of the respective diaphragms with respect to the rail in both lateral directions;

said rail substantially centered with respect to the diaphragms;

at least some of the diaphragms each coupled to a respective leg assembly extending beneath the respective diaphragm on both sides of the rail to support the diaphragm on a support surface.

2. The invention of claim 1 wherein the rail comprises a plurality of interconnected rail segments.

3. The invention of claim 1 wherein the rail comprises first and second flanges, and wherein the guides extend under the flanges to prevent excessive upward movement of the diaphragms with respect to the rail.

4. The invention of claim 1 further comprising:

a plurality of leg assemblies, each leg assembly comprising an upper portion mounted to a respective one of the diaphragms, a lower portion, two side portions, and a centerline extending between the side portions;

each said lower portion connected to two feet shaped to support the respective leg on a support surface;

said feet extending outwardly from the respective leg assembly, away from the centerline, such that the feet are separated from the respective centerline by a maximum distance $D_F$, the side portions are separated from the respective centerline by a maximum distance $D_L$, and the ratio $D_F/D_L$ is greater than 1.1.

5. The invention of claim 4 wherein the ratio $D_F/D_L$ is greater than 1.4.

6. The invention of claim 4 wherein the ratio $D_F/D_L$ is greater than 1.8.

7. The invention of claim 1 further comprising:

a plurality of leg assemblies, each leg assembly comprising an upper portion mounted to a respective one of the diaphragms, a lower portion, two side portions, and a centerline extending between the side portions;

each said lower portion connected to two feet shaped to support the respective leg on a support surface;

said feet extending outwardly from the respective leg assembly, away from the centerline, such that the feet are separated from the respective centerline by a maximum distance $D_F$, the side pardons are separated from the respective centerline by a maximum distance $D_L$, and the difference $D_F$–$D_L$ is greater than 4 cm.

8. The invention of claim 7 wherein the difference $D_F$–$D_L$ is greater than 8 cm.

9. The invention of claim 7 wherein the difference $D_F$–$D_L$ is greater than 12 cm.

10. The invention of 4 or 7 wherein each foot angles downwardly and outwardly from the respective leg assembly.

11. The invention of claim 4 or 7 wherein each foot comprises a side plate adjacent a lower portion of the respective foot, each side plate extending outwardly and downwardly from the respective foot to create a ramp extending transversely to the respective diaphragm.

12. The invention of claim 4 or 7 wherein each leg assembly comprises a respective one of the guides centered on the centerline, each said guide comprising a first pair of spaced plates facing the centerline on one side of the centerline and a second pair of spaced plates facing the centerline on the other side of the centerline.

13. The invention of claim 1 wherein each leg assembly extends on both sides of the rail such that the leg assembly extends laterally outwardly of all of the respective guide and laterally outwardly of all of the rail.

14. The invention of claim 1 wherein each leg assembly comprises two legs, each leg extending on a respective side of the rail such that the legs extend laterally farther from a centerline aligned with the rail than both the guides and the rail.

15. The invention of claim 1 wherein each leg assembly comprises two legs arranged such that all of the rail and the respective guide are disposed between the legs.

16. The invention of claim 1 wherein at least a forward portion of the crash cushion is freestanding.

17. In a highway crash cushion of the type comprising an array of diaphragms, a plurality of energy absorbing elements disposed between the diaphragms, and an array of fender panels extending alongside the diaphragms, the improvement comprising:

a single rail disposed under the crash cushion and anchored to a support surface;

a plurality of guides, each coupled to a respective one of the diaphragms and substantially centered with respect to the respective diaphragm;

said guides mounted on the rail to slide along the rail and to restrict movement of the respective diaphragms with respect to the rail in both lateral directions;

said rail substantially centered with respect to the diaphragms;

wherein the rail comprises a plurality of interconnected rail segments;

wherein each rail segment forms a central protrusion at one end and a central recess at the other end, and wherein the protrusion of one rail segment is received within the recess of an adjacent rail segment.

*18. In a highway crash cushion of the type comprising an array of diaphragms and a plurality of energy absorbing elements disposed between the diaphragms the improvement comprising:*

*a single rail disposed under the crash cushion and anchored to a support surface;*

*a plurality of guides, each coupled to a respective one of the diaphragms and substantially centered with respect to the respective diaphragm;*

*the guides mounted on the rail to slide along the rail and to restrict movement of the respective diaphragms with respect to the rail in both lateral directions;*

*the rail substantially centered with respect to the diaphragms;*

*at least some of the diaphragms each coupled to a respective leg assembly extending beneath the respective diaphragm on both sides of the rail to support the diaphragm on the support surface.*

*19. In a highway crash cushion of the type comprising a diaphragm and at least one energy absorbing element disposed adjacent the diaphragm, the improvement comprising:*

*a support structure comprising a single rail assembly disposed under the crash cushion and comprising a first end and a second end, the support structure being anchored to a support surface between the first and second ends and being substantially centered with respect to the diaphragm,*

*a guide coupled to the diaphragm and substantially centered with respect to the diaphragm,*

*the guide mounted to slide along the support structure and to restrict movement of the diaphragm with respect to the support structure in at least one lateral direction,*

*the diaphragm coupled to a leg assembly extending beneath the diaphragm on both sides of the rail assembly to support the diaphragm on the support surface.*

*20. In a highway crash cushion of the type comprising a diaphragm and at least one energy absorbing element disposed adjacent the diaphragm, the improvement comprising:*

*a support structure comprising a single rail assembly disposed under crash cushion and anchored to a support surface, said single rail assembly substantially centered with respect to the diaphragm,*

*a guide coupled to the diaphragm and substantially centered with respect to the diaphragm,*

*the guide mounted to slide along the support structure and to restrict movement of the diaphragm with respect to the support structure in at least one lateral direction, the guide mounted to slide along the support structure without extending below a lower surface of the support structure,*

*the diaphragm coupled to a leg assembly extending beneath the diaphragm on both sides of said rail assembly to support the diaphragm on the support surface.*

*21. The invention of claim 19 wherein the guide is mounted to slide along the support structure without extending below a lower surface of the support structure.*

*22. The invention of claim 19 wherein the guide is mounted to slide along the support structure and to allow contact between a lower surface of the support structure and the support surface.*

*23. The invention of claim 20 wherein the guide is mounted to slide along the support structure and to allow contact between the lower surface of the support structure and the support surface.*

*24. The invention of claim 20 wherein the support structure comprises a first end and a second end and is anchored to the support surface between the first and second ends.*

*25. The invention of claim 19 or 20 wherein the support structure is anchored to the support surface under the crash cushion.*

*26. The invention of claim 19 or 20 wherein the support structure is anchored to the support surface under the diaphragm or the at least one energy absorbing element.*

*27. The invention of claim 19 or 20 wherein the support structure is anchored to the support surface at a first location and wherein the diaphragm moves past the first location during collapse of the crash cushion.*

*28. The invention of claim 19 or 20 wherein the support structure comprises a plurality of axially aligned, releasably interconnected support structure segments.*

*29. The invention of claim 28 wherein at least one support structure segment forms a recess at one end, the recess adapted to receive a protrusion extending outwardly from an adjacent support structure segment.*

*30. The invention of claim 29 wherein the protrusion extending outwardly from the adjacent support structure segment is formed in the adjacent support structure segment.*

*31. The invention of claim 19 or 20 wherein the guide and the leg assembly provide resistance to overturning in the at least one lateral direction.*

*32. The invention of claim 19 or 20 wherein the guide is mounted to restrict movement of the diaphragm with respect to the support structure in both lateral directions.*

*33. The invention of claim 19 or 20 wherein the support structure comprises first and second flanges, and wherein the guide extends under the flanges to prevent excessive upward movement of the diaphragm with respect to the support structure.*

*34. The invention of claim 19 or 20 wherein the leg assembly extends on both sides of the support structure such that the leg assembly extends laterally outwardly of all of the guide and laterally outwardly of all of the support structure.*

35. The invention of claim 19 or 20 wherein the leg assembly comprises two leas, each leg extending on a respective side of the support structure such that the leas extend laterally farther from a centerline aligned with the support structure than both the guide and the support structure.

36. The invention of claim 19 or 20 wherein the leg assembly comprises two legs arranged such that all of the support structure and the guide are disposed between the legs.

37. The invention of claim 19 or 20 wherein at least a forward portion of the crash cushion is freestanding.

38. The invention of claim 19 or 20 further comprising an additional diaphragm and an additional energy absorbing element disposed between the additional diaphragm and the first-mentioned diaphragm.

39. The invention of claim 38 further comprising a fender panel extending alongside the additional diaphragm and the first-mentioned diaphragm.

40. The invention of claim 38 further comprising an additional guide coupled to the additional diaphragm, wherein the additional guide is mounted to slide along the support structure and to restrict movement of the additional diaphragm with respect to the support structure in at least one lateral direction.

41. The invention of claim 40 wherein the additional guide is mounted to restrict movement of the additional diaphragm with respect to the support structure in both lateral directions.

42. The invention of claim 38 wherein the sport structure is anchored to the support surface between the additional diaphragm and the first-mentioned diaphragm.

43. The invention of claim 19 or 20 further comprising an additional diaphragm and an additional energy absorbing element disposed between the additional diaphragm and the first-mentioned diaphragm, wherein the additional diaphragm is coupled to an additional leg assembly extending beneath the additional diaphragm on at least one side outboard of the support structure to support the additional diaphragm on the support surface.

44. The invention of claim 19 or 20 further comprising an additional diaphragm and an additional energy absorbing element disposed between the additional diaphragm and the first-mentioned diaphragm, wherein the additional diaphragm is coupled to an additional leg assembly extending beneath the additional diaphragm on both sides outboard of the support structure to support the additional diaphragm on the support surface.

45. The invention of claim 19 or 20 further comprising:

an additional diaphragm;

an additional energy absorbing element disposed between the additional diaphragm and the first-mentioned diaphragm;

an additional leg assembly, the additional leg assembly and the first-mentioned leg assembly each comprising an upper portion mounted to a respective one of the additional diaphragm and the first-mentioned diaphragm a lower portion two side portions and a centerline extending between the side portions;

each said lower portion connected to two feet shoed to support the respective lea assembly on the support surface;

the feet extending outwards from the respective leg assembly, away from the centerline such that the feet are separated from the respective centerline by a maximum distance $D_F$, the side portions are separated from the respective centerline by a maximum distance $D_L$, and the ratio $D_F/D_L$, is greater than 1.1.

46. The invention of claim 45 wherein the ratio $D_F/D_L$ is greater than 1.4.

47. The invention of claim 45 wherein the ratio $D_F/D_L$ is greater than 1.8.

48. The invention of claim 45 wherein each foot angles downwardly and outwardly from the respective leg assembly.

49. The invention of claim 45 wherein each foot comprises a side plate adjacent a lower portion of the respective foot each side plate extending outwardly and downwardly from the respective foot to create a ramp extending transversely to the respective one of the additional diaphragm and the first-mentioned diaphragm.

50. The invention of claim 45 wherein the first-mentioned leg assembly comprises the guide and wherein the additional leg assembly comprises an additional guide, the guide and additional guide each centered on the centerline and comprising a first pair of spaced plates facing the centerline on one side of the centerline and a second pair of spaced plates facing the centerline on the other side of the centerline.

51. The invention of claim 19 or 20 further comprising:

an additional diaphragm, an additional energy absorbing element disposed between the additional diaphragm and the first-mentioned diaphragm, an additional leg assembly, the additional leg assembly and the first-mentioned leg assembly each comprising an upper portion mounted to a respective one of the additional diaphragm and the first-mentioned diaphragm, a lower portion, two side portions and a centerline extending) between the side portions, each said lower portion connected to two feet shaped to support the respective leg assembly on the support surface, the feet extending outwardly from the respective leg assembly, away from the centerline, such that the feet are separated from the respective centerline by a maximum distance $D_F$ the side portions are separated from the respective centerline by a maximum distance $D_L$, and the difference $D_F$–$D_L$ is greater than 4 cm.

52. The invention of claim 51 wherein the difference $D_F$–$D_L$ is greater than 8 cm.

53. The invention of claim 51 wherein the difference $D_F$–$D_L$ is greater than 12 cm.

54. The invention of claim 51 wherein each foot angles downwardly and outwardly from the respective leg assembly.

55. The invention of claim 51 wherein each foot comprises a side plate adjacent a lower portion of the respective foot each side plate extending outwardly and downwardly from the respective foot to create a ramp extending transversely to the respective one of the additional diaphragm and the first-mentioned diaphragm.

56. The invention of claim 51 wherein the first-mentioned leg assembly comprises the guide and wherein the additional leg assembly comprises an additional guide, the guide and additional guide each centered on the centerline and comprising a first pair of spaced plates facing the centerline on one side of the centerline and a second pair of spaced plates facing the centerline on the other side of the centerline.

57. The invention of claim 19 or 20 wherein the support structure comprises at least three axially aligned, releasably interconnected support structure segments wherein the support structure is anchored to the support surface near a first end of the support structure, near a second end of the support structure, and intermediate the first and second ends of the support structure.

58. The invention of claim 19 or 20 further comprising an additional element the energy absorbing element being disposed between the diaphragm and the additional element.

*59. The invention of claim 58 further comprising a fender panel extending alongside the diaphragm and the additional element.*

*60. The invention of claim 19 or 20 wherein the rail assembly comprises first and second laterally separated elements positioned to restrict upward movement of the guide said elements extending long an axial direction defined by the rail assembly.*

*61. The invention of claim 60 wherein the guide comprises first and second guide elements positioned below the first and second rail assembly elements, respectively.*

*62. The invention of claim 60 wherein the first and second rail assembly elements comprise respective downwardly-facing surfaces.*

*63. The invention of claim 60 wherein the first and second elements comprise respective horizontally-extending flanges.*

* * * * *